(12) United States Patent
Arias

(10) Patent No.: US 7,181,416 B2
(45) Date of Patent: Feb. 20, 2007

(54) MULTI-FUNCTION TRANSACTION PROCESSING SYSTEM

(75) Inventor: Luis Arias, Miami, FL (US)

(73) Assignee: Blackstone Corporation, Miami, FL (US)

( * ) Notice: Subject to any disclaimer, the term of this patent is extended or adjusted under 35 U.S.C. 154(b) by 844 days.

(21) Appl. No.: 10/120,896

(22) Filed: Apr. 11, 2002

(65) Prior Publication Data

US 2002/0188510 A1   Dec. 12, 2002

Related U.S. Application Data

(63) Continuation-in-part of application No. 09/588,917, filed on Jun. 8, 2000, now Pat. No. 6,651,885.

(51) Int. Cl.
*G07G 1/12* (2006.01)

(52) U.S. Cl. .......................................... 705/24; 705/21

(58) Field of Classification Search ................ 705/15, 705/16, 17, 18, 20, 21, 22, 28, 26, 24; 235/7 R, 235/31 R, 31 T
See application file for complete search history.

(56) References Cited

U.S. PATENT DOCUMENTS

| | | | |
|---|---|---|---|
| 4,359,631 A | | 11/1982 | Lockwood et al. |
| 4,399,510 A | | 8/1983 | Hicks |
| 4,567,359 A | | 1/1986 | Lockwood |
| 4,783,064 A | * | 11/1988 | Hayashi ...................... 271/131 |
| 4,818,854 A | | 4/1989 | Davies et al. |
| 4,872,660 A | * | 10/1989 | Kameyama et al. ....... 271/9.02 |
| 4,877,947 A | | 10/1989 | Mori |
| 4,908,761 A | | 3/1990 | Tai |
| 4,951,308 A | | 8/1990 | Bishop et al. |
| 5,076,562 A | * | 12/1991 | Sai et al. .................... 271/9.08 |
| 5,145,160 A | * | 9/1992 | Nagashima et al. ....... 271/9.09 |

(Continued)

FOREIGN PATENT DOCUMENTS

EP    0 406 841 A1    1/1991

(Continued)

OTHER PUBLICATIONS

U.S. Appl. No. 09/588,917; Notice of Allowance and Fee(s) Due; Dec. 11, 2001.

(Continued)

*Primary Examiner*—James A Kramer
(74) *Attorney, Agent, or Firm*—Malloy & Malloy, P.A.

(57) ABSTRACT

A multi-function transaction processing system including a transaction terminal having a data entry facility and a transaction processor, the transaction processor being communicatively associated with a control processor that defines user accounts and issues one or more authorization codes associated with the user account(s) in response to payment authorities provided at the transaction terminal utilizing a payment authority input of the data entry facility. Furthermore, a printer assembly is communicatively associated with the transaction terminal and generates a card assembly, the card assembly including a first portion containing the authorization code thereon, a second portion including additional promotional materials thereon, and an indicator structured to signify to the printer assembly the orientation of the card assembly relative thereto so as to prevent improper printing. The user account as defined by the control assembly, includes a defined value, the authorization code provided being utilized to facilitate a transaction in accordance with that defined value.

33 Claims, 2 Drawing Sheets

U.S. PATENT DOCUMENTS

| | | | |
|---|---|---|---|
| 5,146,067 A | | 9/1992 | Sloan et al. |
| 5,156,385 A | * | 10/1992 | Muto et al. ............... 271/3.2 |
| 5,243,174 A | | 9/1993 | Veeneman et al. |
| 5,250,789 A | | 10/1993 | Johnsen |
| 5,285,282 A | | 2/1994 | Cavazos et al. |
| 5,285,382 A | | 2/1994 | Muehlberger et al. |
| 5,299,796 A | * | 4/1994 | Wooldridge ............... 271/9.01 |
| 5,513,117 A | | 4/1996 | Small |
| 5,557,518 A | | 9/1996 | Rosen |
| 5,577,109 A | | 11/1996 | Stimson et al. |
| 5,578,808 A | | 11/1996 | Taylor |
| 5,621,787 A | | 4/1997 | McKoy et al. |
| 5,637,845 A | | 6/1997 | Kolls |
| 5,673,309 A | | 9/1997 | Woynoski et al. |
| 5,681,787 A | | 10/1997 | Seamans et al. |
| 5,687,087 A | | 11/1997 | Taggart |
| 5,696,908 A | | 12/1997 | Muehlberger et al. |
| 5,721,768 A | | 2/1998 | Stimson et al. |
| 5,722,067 A | | 2/1998 | Fougnies et al. |
| 5,778,313 A | | 7/1998 | Fougnies |
| 5,828,740 A | | 10/1998 | Khuc et al. |
| 5,845,259 A | | 12/1998 | West et al. |
| 5,854,975 A | | 12/1998 | Fougnies et al. |
| 5,868,236 A | | 2/1999 | Rademacher |
| 5,884,292 A | | 3/1999 | Baker et al. |
| 5,892,827 A | | 4/1999 | Beach et al. |
| 5,903,633 A | | 5/1999 | Lorsch |
| 5,970,469 A | | 10/1999 | Scroggie et al. |
| 5,980,011 A | * | 11/1999 | Cummins et al. ............... 347/4 |
| 5,988,509 A | | 11/1999 | Taskett |
| 5,991,380 A | | 11/1999 | Bruno et al. |
| 5,991,749 A | | 11/1999 | Morrill, Jr. |
| 5,999,914 A | | 12/1999 | Blinn et al. |
| 6,032,859 A | | 3/2000 | Muehlberger et al. |
| 6,035,025 A | | 3/2000 | Hanson |
| 6,050,493 A | | 4/2000 | Fertig |
| 6,081,791 A | | 6/2000 | Clark |
| 6,105,009 A | | 8/2000 | Cuervo |
| 6,149,055 A | | 11/2000 | Gatto |
| 6,152,029 A | | 11/2000 | Templeton |
| 6,155,487 A | | 12/2000 | Dean et al. |
| 6,169,975 B1 | | 1/2001 | White et al. |
| 6,269,343 B1 | | 7/2001 | Pallakoff |
| 6,308,887 B1 | * | 10/2001 | Korman et al. ............. 235/379 |
| 6,318,536 B1 | * | 11/2001 | Korman et al. ............. 194/217 |
| 6,402,039 B1 | | 6/2002 | Freeman et al. |
| 6,405,182 B1 | | 6/2002 | Cuervo |
| 6,431,537 B1 | * | 8/2002 | Meier ........................ 271/9.01 |
| 6,457,886 B1 | * | 10/2002 | Meier ........................ 400/541 |
| 6,526,130 B1 | | 2/2003 | Paschini |
| 6,575,361 B1 | | 6/2003 | Graves et al. |
| 6,651,885 B1 | | 11/2003 | Arias |
| 6,659,259 B2 | | 12/2003 | Knox et al. |
| 6,688,740 B2 | * | 2/2004 | Driggers ..................... 347/104 |
| 2002/0121545 A1 | | 9/2002 | Eguchi et al. |
| 2003/0106934 A1 | | 6/2003 | McCall et al. |
| 2004/0122753 A1 | | 6/2004 | Yap et al. |

FOREIGN PATENT DOCUMENTS

| | | |
|---|---|---|
| EP | 0 527 639 A2 | 2/1993 |
| EP | 0 627 714 A2 | 12/1994 |
| FR | 2 779 381 A1 | 12/1999 |
| GB | 2 338 814 A | 12/1999 |
| JP | 01261799 A | 10/1989 |
| JP | 11134539 A | 5/1999 |
| JP | 2000099811 A | 4/2000 |
| KR | 2001074614 A | 8/2001 |
| WO | WO 95/12169 | 5/1995 |
| WO | WO 96/38801 | 12/1996 |
| WO | WO 96/41462 | 12/1996 |
| WO | WO 97/30409 | 8/1997 |
| WO | WO 98/47116 | 10/1998 |
| WO | WO 99/23622 | 5/1999 |
| WO | WO 99/25106 | 5/1999 |
| WO | WO 99/62038 | 12/1999 |
| WO | WO 00/79492 A1 | 12/2000 |
| WO | WO 01/43095 A2 | 6/2001 |
| WO | WO 01/91070 A3 | 11/2001 |
| WO | WO 01/95264 A2 | 12/2001 |

OTHER PUBLICATIONS

U.S. District Court—S.D. of Florida (Miami), *Exigent Technology v Prepaid Network, et al.* (Dated Nov. 28, 2005 / Miami, FL).

U.S. District Court—S.D. of Florida (Miami), *Exigent Technology v Atrana Solutions* (Dated Nov. 28, 2005 / Miami, FL).

U.S. District Court—S.D. of Florida (Miami), *Exigent Technology v Radiant Telecom, Inc., et al.* (Dated Nov. 28, 2005 / Miami, FL).

Plaintiff's Reply Memorandum in Support of its Motion for a 30-Day Extension of Time To Disclose a Technical Expert [Filed Aug. 29, 2005 / Miami, FL].

Defendant Rodriguez's Notice of Joining Defendants . . . Brief in Support of Defendants' Markman Claim Construction [Entered Aug. 31, 2005 / Miami, FL].

Plaintiff's Motion for Consolidation of this Action [Filed Sep. 12, 2005 / Miami, FL].

Joint Markman Hearing Memorandum [Filed Oct. 3, 2005 / Miami, FL].

Order Granting Plaintiff's Motion to Consolidate . . . and Instructing Clerk of Court to Consolidate Action [Filed Oct. 7, 2005 / Miami, FL].

Answer and Affirmative Defenses to Complaint, Counterclaims by Defendants . . . [Filed Oct. 12, 2005 / Miami, FL].

Markman Hearing Transcript [Filed Oct. 14, 2005 / Miami, FL].

Parties' Stipulation of Claim Construction of Certain Terms of U.S. Patent No. 6,651,885 [Entered Oct. 19, 2005 / Miami, FL].

Supplemental Claim Construction Brief [Filed Oct. 20, 2005 / Miami, FL].

Plaintiff's Supplemental Markman Brief [Filed Oct. 20, 2005 / Miami, FL].

Claim Chart Comparison [Filed Oct. 21, 2005 / Miami, FL].

Plaintiff's Notice of Filing Amended Joint Claim Construction Statement . . . [Filed Nov. 9, 2005 / Miami, FL].

Markman Hearing (Continued) Transcript [Filed Nov. 15, 2005 / Miami, FL].

U.S. District Court—N.D. of Georgia (Atlanta), *Exigent USA, v Presolutions, et al.* (Dated Nov. 28, 2005 / Atlanta, GA).

Joint Claim Construction Statement [Filed Oct. 14, 2005 / Atlanta, GA].

Amended Joint Claim Construction Statement [Filed Oct. 26, 2005 / Atlanta, GA].

U.S. District Court—S.D. of Florida (Miami), *Exigent Technology v NuMind Software, et al.* (Dated Nov. 28, 2005 / Miami, FL).

Complaint [Filed Sep. 2, 2005 / Miami, FL].

Plaintiff's Motion for Transfer and Consolidation of this Action [Filed Sep. 26, 2005 / Miami, FL].

Order of Transfer [Miami, FL].

Order Granting Plaintiffs Motion to Consolidate . . . and Instructing Clerk of Court to Consolidate Action [Filed Oct. 3, 2005 / Miami, FL].

U.S. District Court-S.D. of Florida (Miami), Civil Docket for Case No. 03-CV-23400, Exigent Technology v. Prepaid Network, et al. (Dated Jun. 20, 2006 / Miami, FL).

U.S. District Court-S.D. of Florida (Miami), Civil Docket for Case No. 04-CV-22140, Exigent Technology v. Radiant Telecom, Inc., et al. (Dated Jun. 20, 2006 / Miami, FL).

Defendants' Response to Plantiff's Motion to Strike the Supplemental Expert Report of Jose Fortes [Case No. 04-CV-22140 / Filed Mar. 6, 2006 / Miami, FL].

Claims Construction Order [Case No. 04-CV-22140 / Filed Mar. 15, 2006 / Miami, FL].

Plaintiff's Reply in Support of its Motion to Strike the Supplemental Expert Report of Jose Fortes [Case No. 04-CV-22140 / Filed Mar. 16, 2006 / Miami, FL].

Ds' Notice of Filing Copy of Request for Rexamination of the '885 Patent Filed with the U.S. PTO [Case No. 04-CV-22140 / Filed Mar. 23, 2006 / Miami, FL].

Ds' Motion for Recon. of the Ct's Claim Construction Order in View of Fed.Cir. Decision & Motion for Clarification [Case No. 04-CV-22140 / Filed Mar. 27, 2006 / Miami, FL].

Defendants' Motion to Exclude Expert Testimony of John Cosgrove [Case No. 04-CV-22140 / Filed Mar. 27, 2006 / Miami, FL].

Plaintiff's Motion to Preclude the Expert Testimony and Reports of Dr. Jose Fortes [Case No. 04-CV-22140 / Filed Mar. 27, 2006 / Miami, FL].

D Radiant's Motion for Sum. Judgement of Invalidity (§102-Prior Art Printed Publications) & Incorporated Memo of Law [Case No. 04-CV-22140 / Filed Apr. 6, 2006 / Miami, FL].

Ds Netel's Motion for Summary Judgment of Unenforceability and Non-Infringement and Incorporated Memorandum of Law [Case No. 04-CV-22140 / Filed Apr. 6, 2006 / Miami, FL].

Defendant Iprepay, Inc.'s Motion for Summary Judgment of Non-infringement and Incorporated Memorandum of Law [Case No. 04-CV-22140 / Filed Apr. 6, 2006 / Miami, FL].

D Ntera's Motion for Summary Judgment of Invalidity (§102-Prior Art Commercial Systems) & Incorporated Memo of Law [Case No. 04-CV-22140 / Filed Apr. 6, 2006 / Miami, FL].

Ds Intelligent's & Ntera's Motion for Summary Judgment of Non-Infringement & Incorporated Memorandum of Law [Case No. 04-CV-22140 / Filed Apr. 6, 2006 / Miami, FL].

Ds Numind's Motion for Summary Judgment of Non-Infringement & Invalidity (§112) & Incorporated Memorandum of Law [Case No. 04-CV-22140 / Filed Apr. 6, 2006 / Miami, FL].

Ps' Motion & Memorandum in Support Thereof for Summary Judgment on Infringement, Invalidity & Unenforceability [Case No. 04-CV-22140 / Filed Apr. 7, 2006 / Miami, FL].

Notice of Filing [Case No. 04-CV-22140 / Filed Apr. 7, 2006 / Miami, FL].

Counterclaim Ds' Motion & Memo of Law in Support for Sum. Judg'mt on the counterclaims [Case No. 04-CV-22140 / Filed Apr. 7, 2006 / Miami, FL].

P's Motion to Strike & Opposition to Ds' Motion for Recon. & Clarification of the Ct's Claim Construction Order [Case No. 04-CV-22140 / Filed Apr. 11, 2006 / Miami, FL].

Defendant's Opposition to Preclude the Expert Testimony and Reports of Dr. Jose Fortes [Case No. 04-CV-22140 / Filed Apr. 13, 2006 / Miami, FL].

Plaintiff's Opposition to Defendants' Motion to Exclude Expert Testimony of John Cosgrove [Case No. 04-CV-22140 / Filed Apr. 13, 2006 / Miami, FL].

Plaintiff's Opposition to Defendants' Motion to Exclude Expert Testimony of Martin M. Zoltick [Case No. 04-CV-22140 / Filed Apr. 13, 2006 / Miami, FL].

Notice of Filing [Case No. 04-CV-22140 / Filed Apr. 13, 2006 / Miami, FL].

Ds' Opposition to P's Motion & Memo in Support Thereof for Sum. Judg'nt of Infringement, Invalidity & Unenforceability [Case No. 04-CV-22140 / Filed Apr. 21, 2006 / Miami, FL].

Iprepay's Opposition to Counterclaim Defendants' Motion for Summary Judgment on Counterclaims [Case No. 04-CV-22140 / Filed Apr. 21, 2006 / Miami, FL].

Ds' Opp. to P's Motion to Strike & Reply to P's Opp. to Motion for Recon. & Clarification of Ct's Claim Construct Order [Case No. 04-CV-22140 / Filed Apr. 21, 2006 / Miami, FL].

Plaintiff's Opposition to Defendants, Iss, LLC and Ntera, Inc.'s Motion for Summary Judgment [Case No. 04-CV-22140 / Filed Apr. 21, 2006 / Miami, FL].

Plaintiff's Opposition to Netel, Inc.'s Motion for Summary Judgment on Unenforceability and Non-Infrigement [Case No. 04-CV-22140 / Filed Apr. 21, 2006 / Miami, FL].

Plaintiff's Opposition to Defendant, Iprepay, Inc.'s Motion for Summary Judgment [Case No. 04-CV-22140 / Filed Apr. 21, 2006 / Miami, FL].

Plaintiff's Reply in Support if its Motion to Preclude the Expert Testimony and Reports of Dr. Jose Fortes [Case No. 04-CV-22140 / Filed Apr. 21, 2006 / Miami, FL].

P's Opposition to Radiant's Motion for Summary Judgment of Invalidity Based Upon Anticipation Due to Prior Printed Art [Case No. 04-CV-22140 / Filed Apr. 21, 2006 / Miami, FL].

P's Opposition to Ntera's Motion Sum. Judg'mt of Invalidity Based Upon Anticipation Due to Prior Art Commercial Systems [Case No. 04-CV-22140 / Filed Apr. 21, 2006 / Miami, FL].

P's Opposition to Numind Software Systems, Inc.'s Motion for Summary Judgment on Non-Infringement and Invalidity [Case No. 04-CV-22140 / Filed Apr. 21, 2006 / Miami, FL].

Defendants' Reply to Plaintiff's Opposition to Defendants' Motion to Exclude Expert Testimony of John Cosgrove [Case No. 04-CV-22140 / Filed Apr. 24, 2006 / Miami, FL].

Defendants' Reply to Plaintiff's Opposition to Defendants' Motion to Exclude Expert Testimony of Martin M. Zoltick, Esq [Case No. 04-CV-22140 / Filed Apr. 24, 2006 / Miami, FL].

Defendants' Agreed Motion to Stay Litigation Pending Reexamination of the '885 Patent by the United States Patent Office[Case No. 04-CV-22140 / Filed Apr. 27, 2006 / Miami, FL].

Defendant Iprepay's Reply to Plaintiff's Opposition to Defendants' Motion for Summary Judgment of Non-Infringement [Case No. 04-CV-22140 / Filed May 1, 2006 / Miami, FL].

Reply to Plaintiff's Opposition to Defendant Netel's Motion for Summary Judgment of Unenforceability and Non-infringement [Case No. 04-CV-22140 / Filed May 1, 2006 / Miami, FL].

D Ntera's Reply to P's Opp. to Motion for Sum. Judg'mt of Invalidity Based Upon Anticipation Due to Prior Art Com System [Case No. 04-CV-22140 / Filed May 1, 2006 / Miami, FL].

D Radiant's Reply to P's Opposition to Motion for Sum Judgment of Invalidity Based Anticipation Due to Printed Prior Art [Case No. 04-CV-22140 / Filed May 1, 2006 / Miami, FL].

D Numind's Reply to P's Opposition to Motion for Summary Judgment on Non-Infringement & Invalidity (§112) [Case No. 04-CV-22140 / Filed May 1, 2006 / Miami, FL].

Defendants' Reply to Plaintiff's Opposition to Defendants' Motion for Summary Judgment of Non-Infringement [Case No. 04-CV-22140 / Filed May 1, 2006 / Miami, FL].

Plaintiff's Reply in Support of its Motion for Summary Judgment on Infringement [Case No. 04-CV-22140 / Filed May 1, 2006 / Miami, FL].

Counterclaim Defendants' Reply in Support of Their Motion for Summary Judgment [Case No. 04-CV-22140 / Filed May 1, 2006 / Miami, FL].

Order Staying Litigation Pending Patent Reexamination and Denying Motions for Summary Judgment Without Prejudice [Case No. 04-CV-22140 / Filed May 2, 2006 / Miami, FL].

U.S. District Court - N.D. of Georgia (Atlanta), Civil Docket for Case No. 1:04-CV-02693-RLV, Exigent USA, Inc. v. Presolutions, Inc. et al. (Dated Jun. 20, 2006 / Atlanta, GA).

[Proposed] Dismissal With Prejudice [Case No. 1:04-CV-02693-RLV / Filed Apr. 24, 2006 / Atlanta, GA].

U.S. District Court - S.D. of Florida (Miami), Civil Docket for Case No. 04-CV-20484, Exigent Technology v. Atrana Solutions (Dated Jun. 20, 2006 / Miami, FL).

Atrana's Memorandum of Law in Opposition to P's Motion to Vacate Summary Judgment & Enforce Settlement Agreement [Case No. 04-CV-20484 / Filed Apr. 19, 2006 / Miami, FL].

P's Notice of Filing Support for Motion to Enforce S. A., Vacate Order Granting Sum Judgment (D. E.89) & to Dismiss Case [Case No. 04-CV-20484 / Filed Apr. 19, 2006 / Miami, FL].

Order [Case No. 04-CV-20484 / Filed Apr. 27, 2006 / Miami, FL].

Final Judgment [Case No. 04-CV-20484 / Filed May 22, 2006 / Miami, FL].

Amended Notice of Appeal [Case No. 04-CV-20484 / Dated May 24, 2006 / Miami, FL].

U.S. Court of Appeals for the Federal Circuit, Exigent Tech v. Atrana Solutions - Case Summary (Dated Jun. 20, 2006 / Washington, D.C.).

U.S. Court of Appeals for the Federal Circuit, Exigent Tech v. Atrana Solutions - Case Details (Dated Jun. 20, 2006 / Washington, D.C.).

U.S. Court of Appeals for the Federal Circuit, Exigent Tech v. Atrana Solutions - Listing of Briefs (Dated Jun. 20, 2006 / Washington, D.C.).

Brief of Appellant (Non-Confidential) [Date of Brief: Jun. 13, 2005 / Washington, D.C.].

Brief for Defendant-Appellee (Non-Confidential) [Dated Jul. 25, 2005 / Washington, D.C.].

Reply Brief of Appellant (Non-Confidential) [Date of Brief: Aug. 12, 2005 / Washington, D.C.].

Decision [Decided: Mar. 22, 2006 / Washington, D.C.].

* cited by examiner

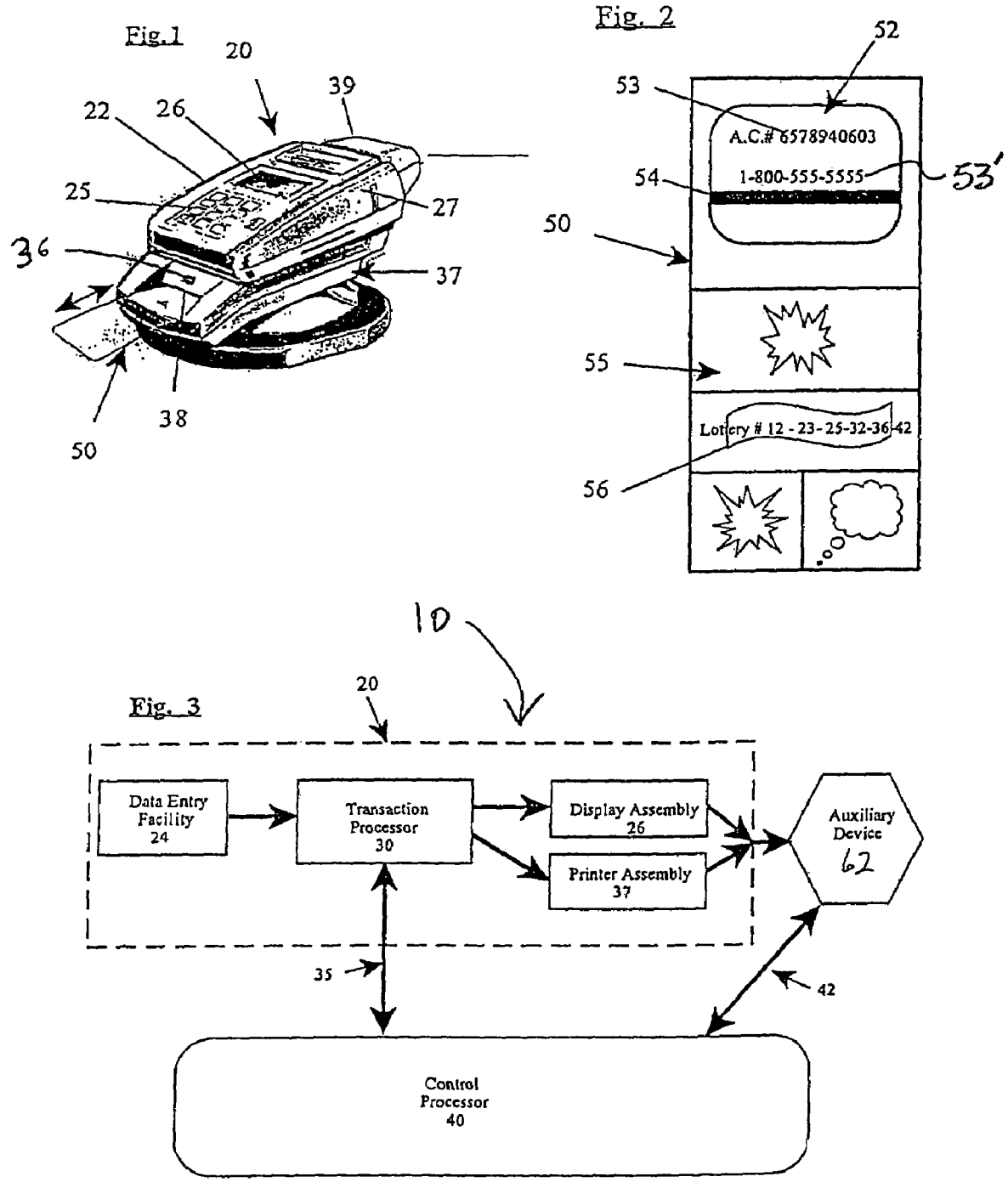

MULTI-FUNCTION TRANSACTION PROCESSING SYSTEM

CLAIM OF PRIORITY

The present application is a continuation-in-part application of previously filed, now pending application having Ser. No. 09/588,917, filed on Jun. 8, 2000, which has matured into U.S. Pat. No. 6,651,885, wherein the content thereof is included herein by reference, in its entirety.

BACKGROUND OF THE INVENTION

1. Field of the Invention

The present invention relates to a multi-function transaction processing system which many be disposed at a commercial location in order to complete a variety of commercial transactions, including credit/debit card purchases, while also facilitating one or more alternate, commercially advantageous functions including the issuance of authorization codes for purposes related to pre-paid telephony service, Internet purchases, lottery purchases, and the like. Furthermore, the multi-function transaction processing system provides an effective source for the dissemination of a variety of promotional materials in connection with the transaction being completed utilizing the system and is configured to produce and issue a customized card to a particular user with minimal printer error and account losses.

2. Description of the Related Art

With the ever increasing popularity of credit or debit card payments at commercial establishments, it is becoming increasingly commonplace to find small credit card transaction terminals at commercial establishments such as grocery stores, gas stations, convenience stores, and the like. Typically, these conventional credit/debit card transaction terminals are linked to an affiliated service so as to provide for the approval of a particular transaction, thereby facilitating payment to the merchant. Such traditional transaction terminals are, however, limited to providing authorization for a particular purchase in lieu of a cash payment for products or services that are normally offered by the merchant. As a result, while they are a convenience for the operators of commercial establishments, they do not provide any added commercial advantage to the commercial establishment. Indeed, the convenience factor is generally the only factor to offset the service fees that must typically be paid by the commercial establishments to the authorizing entity. As a result, it would be beneficial to provide an enhanced transaction terminal as part of a transaction system, which in addition to facilitating traditional credit/debit card purchases, will also provide an added source of economic benefit for the commercial establishments employing such a system, directly as a result of its use.

An example of an added source of revenue that has become increasingly popular for merchants includes the calling card industry, wherein a particular commercial advantage is being attained from the sale of pre-paid calling cards. Specifically, such pre-paid calling cards are typically supplied in bulk to a retail establishment where they may be sold at specific monetary denominations. In essence, each pre-paid, pre-printed calling card provides a purchasing consumer with the appropriate access to a defined amount of telephony connection time. As a result, the consumer, often at a reduced rate, is able to initiate any desired telephony communication from any telephone, without incurring toll or other service charges in connection with that telephone.

Despite advances in the calling card industry, it is often commercially limiting to provide the physical cards to the commercial or retail establishments for appropriate sale to the consumers. For example, if sales are slow at a particular location, an inventory of cards will remain unused and unsold. The fact that a finite amount of air time is purchased by the operators of the card requires that the time remain un-used in case a purchase does not occur with regard to a pre-printed account. Conversely, an establishment which makes a large volume of sales may run out of cards and future potential sales will be lost as no cards are available. Yet another inconvenience associated with traditional pre-printed calling card relates to the need for inventory space to store large volumes of physical cards, naturally resulting in added expense, and the fact that the cards, once printed, cannot be changed if retail identity, rates, etc., change, and provide an actual commodity susceptible to theft or other misappropriation.

To this end, others in the art have sought to develop individual card printing devices. Specifically, such devices are generally standard printing devices that print a particular calling card on demand, thereby minimizing the space and inventory requirements of the commercial establishments and permitting at least a degree of variability, such as in connection with card denominations. Unfortunately, however, such systems are still severely limited, as each card printing terminal is provided with a finite number of access codes to be printed on a finite number of calling cards. Typically, a quantity of the access codes are downloaded into the individual terminal at a predetermined period of time, in much the same manner that traditional cards are stocked at the establishment. As a result, they do not alleviate the problems associated with outstanding, unsold access codes/pin numbers, or the loss of sales after depletion of an initially defined volume of cards. Furthermore, such terminals are merely printers which print a number of a cards, and they do not provide any further business enhancing qualities or functions which provide a commercial advantage to the establishment utilizing the terminal, beyond merely the sale of a calling card. Moreover, it is also recognized that whenever an attempt to customize the appearance of a particular card is made, significant losses to missprints and the like can occur. For example, if a card stock is provided with indica on one face and a printable surface on an opposite face, improper introduction of a stock card into the printer will result in either an illegible print and/or the failure of a thermal type printer to print anything on the card. Still, however, under such circumstances the authorization code has been generated and issued, and the printing of a new card results in the issuance of a new authorization number. In such a situation, even if the transaction is voided, the authorization number is used and remains 'open' in the control system. Naturally such can be very costly and inconvenient to service providers as they often deal with finite number blocks of authorization numbers and it is not practical to have a large number of outstanding numbers which the service provider cannot distinguish between actually purchased, but yet unused cards versus misprints.

Accordingly, there is still a need in the art for a calling card system which does not have to be limited in terms of quantities sold, allows for complete card versatility, and ensures that proper utilization of all resources is maintained without waste, improper printing or storage problems. Additionally, such a transaction system should provide enhanced functionality so as to provide a variety of commercially advantageous services/products for a particular establishment, providing consumer incentive for the calling card purchases and providing a mechanism wherein the costs associated with the calling card to the retailer or distributor can be offset through the association of alternative commercial endeavors, such as promotions and other services.

The present invention also recognizes that given the advances of global computerized network communications and commerce, increased purchase avenues are continuously being made available to consumers. Unfortunately, however, many traditional consumers still have security concerns associated with consummating such electronic transactions, especially if they will be required to transmit credits/debit card information to the merchant. Moreover, in some circumstances, privacy concerns also restrict a consumer's desire to make certain purchases by traditional means. As a result, it would be beneficial to provide a transaction system which is capable of offering prepaid services which can not only be utilized for such traditional services as telephony communication, but which also provides a means through which a consumer can establish a prepaid purchase, utilizing that pre-payment for any of a variety of products or services.

SUMMARY OF THE INVENTION

The present invention is directed to a multi-function transaction processing system. The transaction processing system includes a transaction terminal that may be disposed at any establishment, including a commercial or retail type establishment. In particular, the transaction terminal includes a data entry facility and a transaction processor associated therewith. Moreover, the transaction processor, which facilitates a variety of the operational functions of the transaction terminal, is communicatively associated with a control processor.

The data entry facility associated with the transaction terminal includes a payment authority input which accepts a payment authority, such as a credit card transaction or acknowledgment of cash payment. In this regard, the control processor is a structured to define a user account, and to issue an authorization code associated with the user account at least in response to a payment authority received at the transaction terminal.

The transaction processing system of the present invention may also include a printer assembly. The printer assembly is communicatively associated with the transaction terminal and is structured to at least generate a card assembly. In the illustrated embodiment, the card assembly may be generally elongate, including one or more portions, as well as a first face and a second face. For example, a first portion of the card assembly may include at least the authorization code thereon, while a second portion of the card assembly many include promotional materials thereon. As such, when a consumer completes an appropriate transaction where an authorization code is required for a particular future transaction, the consumer will be provided with the card assembly to facilitate their maintenance and/or conveyance of the authorization code. Conversely, the second portion may include promotional materials which can be distributed to the consumer and provides an incentive for consumer purchase. Also, it may be preferred that all of the information, including the authorization code and any promotional materials be printed on one of the two faces of the card assembly, thus allowing for single sided printing. Moreover, such an embodiment permits the card assemblies to be pre-printed with a logo or other indicia affiliated with the merchant or service provider on the opposite face.

In order to prevent the waste of authorization codes that may result form the improper printing of a card assembly, the card assemblies also preferably include an indicator which is structured to provide an identifiable indication to the printer as to whether the card assembly is properly oriented relative thereto. As such, if the card assembly is not properly oriented and will not print properly, the indicator will prevent the printer assembly from completing the printing and may signal an alert to a user that the card should be re-oriented.

Additionally, the user account defined by the control processor includes a defined value. The defined value is at least partially determined by the payment authority that has been provided at the transaction terminal utilizing the data entry facility. As a result, the authorization code facilitates the subsequent transaction in accordance with that defined value, while the control processor provides necessary confirmations or validations.

These and other features of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a perspective illustration of an embodiment of the transaction terminal and printer assembly associated with the system of the present invention;

FIG. 2 is a illustration of the card assembly of an embodiment of the present invention;

FIG. 3 is a schematic representation of an embodiment of the multi-function transaction processing system of the present invention.

Like reference numerals refer to like parts throughout the several views of the drawings.

DETAILED DESCRIPTION OF THE PREFERRED EMBODIMENT

Figure 4:
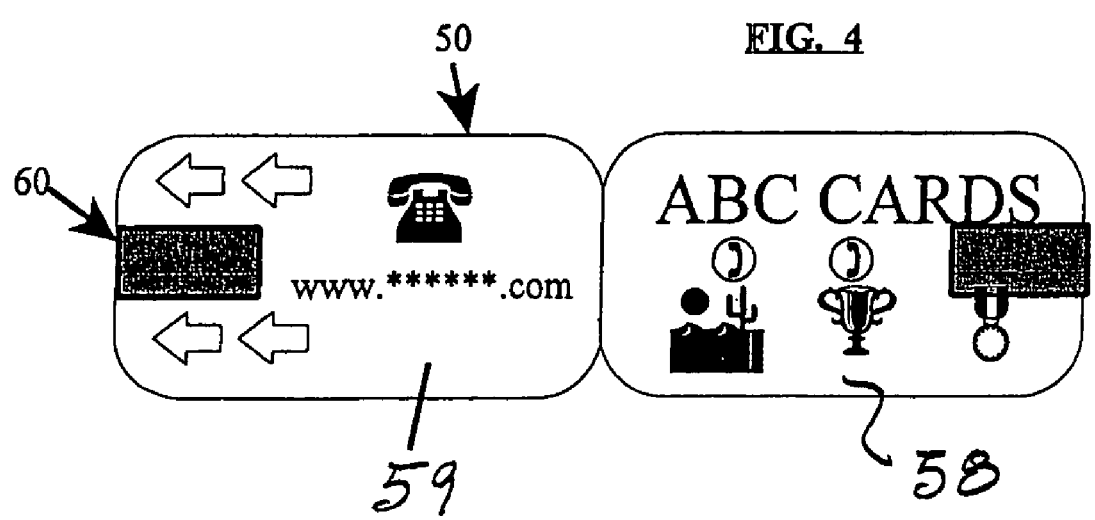
FIG. 4 is an illustration of one embodiment of the card assembly including the indicator thereon.

As illustrated in the figures, the present invention is directed to a multi-function transaction processing system, generally indicated as 10. The transaction processing system 10 is structured to coordinate and facilitate a variety of different transactions in an efficient and integrated manner which provides an increased commercial benefit beyond what is normally available to a merchant utilizing the transaction processing system 10.

Looking to an embodiment of the transaction processing system 10, as illustrated in the figures, the transaction processing system 10 includes at least one transaction terminal 20. The transaction terminal 20 is preferably generally compact and convenient to position within a facility, such as secured directly to a checkout counter or similar location. In this regard, it is recognized that the transaction terminal 20 may be configured and positioned so as to permit its use directly or interactively by a consumer, or to require only an authorized person, such as the merchant, to utilize the transaction terminal 20 to complete the desired transactions of their consumers.

The transaction terminal 20 includes at least a data entry facility 24 and a transaction processor 30. The data entry facility 24 may include one or more of a variety of conventional input facilities, including a keypad 25 which may be separate or integrated as part of a touch screen, a magnetic stripe reader 27 through which a credit or debit card many be passed, and/or any other data entry facility such as a bar code scanner or other scanning device. Furthermore, included as part of one or more aspects of the data entry facility 24 is a payment authority input by which a payment authority may be received and/or communicated to the transaction processor 30. As such, any of the previously mentioned types of the data entry facilities 24 may qualify as the payment authority input, although in the illustrated embodiment the payment authority input includes the keypad 25 and the magnetic stripe reader 27. Additionally, in the illustrated embodiment, the data entry facility 24 may also include an electronic signature capture assembly, such as integrated as part of a display assembly 26. Specifically, such an electronic signature capture assembly 26 is structured to permit a consumer to make an electronic signature directly thereon, thereby avoiding the needed for a carbon receipt to be signed by the consumer, and eliminating the need for a merchant to maintain paper receipts of purchases.

As such, utilizing one or more of the different types of data entry facility 24 configurations recited, a consumer is able to provide a desired payment authority at the transaction terminal 20, which is then communicated to the transaction processor 30. For example, if the consumer wishes to make a purchase from the merchant utilizing the transaction terminal 20, they may pay cash in a traditional fashion or may provide a credit or debit type card to the merchant. The merchant is then able to provide credit card transaction information as the payment authority, such as by keying in the appropriate credit card transaction information and/or passing an appropriate card through the magnetic stripe reader 27. In the illustrated embodiment the credit card transaction information includes at least a credit card account and a transaction amount as the payment authority. It is, however, recognized that the credit card transaction information may include additional information, such as credit card expiration date. Moreover, although for purposes of clarity and ease of explanation reference is being made to a credit card transaction and credit card transaction information, it is understood that a check card, smart card, debit card, check or other similar account payment method may be employed in a conventional fashion, the credit card transaction information including the necessary information for processing a particular purchase, sale or transaction in accordance with the payment account selected.

In addition to receiving credit card transaction information as the payment authority, however, the illustrated embodiment of the present invention may also receive an external payment verification, at least partially as the payment authority. Specifically, and for reasons to be described subsequently, a consumer may make a cash or credit card purchase separate from the transaction terminal 20, but may wish to have a further receipt, authorization, promotional item, completion of a further transaction facilitated by the transaction terminal 20. In such an embodiment, preferably utilizing the keypad 25 as the payment authority input, although it is recognized that alternative payment authority inputs, including a direct link to a transaction computer, cash register, or more traditional credit card authorization device may also be employed, an input related to the external payment verification is provided. For example, if the consumer desires to pay cash, the payment authority can be appropriately entered into the transaction terminal 20 as the external payment verification. In such an embodiment the external payment verification indicates the nature and extent of the external payment and, if desired for security reasons, the transaction processor 30 may require an access authorization in connection with the external payment verification. As such, a validity of the external payment verification can be ensured. The access authorization may include, for example, any access code or other security verification including a key, key card, personal identifier, etc., may be provided as the access authorization, an authorized individual associated with the merchant properly providing the access authorization to indicate that the external payment verification is indeed valid and is backed by the external transaction.

The transaction processing system 10 of the present invention also includes a control processor 40. The control processor 40 is communicatively associated with the transaction processor 30 of the transactional terminal 20. In this regard, it is recognized that one or more control processors 40 may be provided and communicatively associated with one or a plurality of transaction processors 30, a large network of transaction terminals 20 being contemplated. Moreover, the communicativity, as at 35, that is established between the transaction processor 30 and the control processor 40 is preferably two way, and may be achieved through any of a variety of structures, including a dedicated connection, a network type connection, a wireless connection, an Internet connection and the like, so long as at least some degree of preferably secure data transmitting communication may be achieved. Along the these lines, the transaction processor 30 is structured to communicate the payment authorities received at the transaction terminal 20 to the control processor 40. Moreover, in some instances, such as with a conventional credit card transaction, the control processor 40 is structured to validate and/or authorize the payment authority, such as by verifying the credit card account information or ensuring that the access authorization associated with an external payment verification is a valid.

In addition to providing such approvals for conventional point of sale type purchases, the control processor 40 is also structured to define a user account and to issue an authorization code associated with the user account, such as for the benefit of a consumer in connection with a further transaction, to be described. Generally, the authorization code and user account are defined by the control processor 40, at least partially in response to the payment authority received at the transaction terminal 20. Furthermore, the user account defined by the control processor 40 may include a defined value, such as a dollar value or transaction quantity/frequency value, which is also at least partially defined by the payment authority. As a result, the authorization code issued by the control processor 40 is structured to facilitate a transaction in accordance with the predefined value of the user account for which the authorization code was issued. As will be described subsequently, the control processor 40 preferably communicates the authorization code to the transaction terminal 20 for communication to the consumer, if necessary.

Although the authorization code defined by the control processor 40 may be communicated to a consumer in a variety of fashions, such as merely by illustrating it on the display assembly 26 of the transactional terminal 20, in the illustrated embodiment, the multi-function transaction processing system 10 also includes a printer assembly 37 through which at least a printout of the authorization code may be provided for the consumer. Specifically, the printer assembly 37 is preferably communicatively associated with the transaction terminal 20 and is structured to generate a card assembly 50. The card assembly 50, which may be constructed of a generally thick card stock type material, may also be generally elongate, as illustrated in FIGS. 2 and 4, 50 as to define a greater amount of information receiving surface area. Of course, however, it is recognized that although physical printing of the authorization code 53 on the card assembly 50 is to be described in connection with the illustrated printer assembly 37, other types of printed encoding, such as the making of encoded markings or the appropriate encoding of a magnetic stripe 54, or other data storage structure on the card assembly 50 may also be utilized and are considered within the scope of the present description of printing. In the illustrated embodiment, the card assembly 50 includes at least a first portion 52 and a second portion 55. The first portion 52 includes the authorization code 53 thereon, such as in the form of printing of the authorization code directly on the first portion 52. Additionally, in the case of a telephony communication transaction, as will be described, a telephony access number 53' may also be disposed on the first portion 52 of the card assembly, the telephony access number 53' to be utilized to initiate the telephony communication with a telephony server. Furthermore, so as to facilitate usage of the first portion 52 of the card assembly 50 in a manner similar to conventional prepaid calling cards, the first portion 52 may be detachable from the second portion 55, thereby permitting the first portion 52 to be substantially compact such as in the form of a credit card or similar sized structure, or in the form of a smaller structure such as may be hung from a key chain. Also, as seen in FIG. 2, one or more aspects of the card assembly 50 may be provided on a magnetic stripe 54 or other encoded structure in addition to or instead of direct printing on the surface of the card assembly 50.

Looking to the second portion 55 of the card assembly 50, among other items, it preferably includes promotional materials disposed or depicted thereon. Specifically, the promotional materials may include coupons, advertisements and/or a variety of other promotional articles which may be attractive to a consumer, or which a merchant may wish to promote to consumers obtaining an authorization code for a desired transaction. As such, the merchant, distributor or other individuals associated with the transaction terminal 20 may, if desired, achieve an additional source of revenue through payments or offsets from the source(s) of the coupons and or advertisements depicted by the second portion 55 of the card assembly 50. This also, provides an added value to the consumer of the card assembly 50 through the additional promotional items, discounts and the like, thereby adding increase incentive to purchase such a card assembly over other competing products.

Also, turning to FIG. 4, it is noted that the card assembly 50 includes a first face 58 and a second face 59. In one preferred embodiment, the first face 58 has a quantity of pre-printed materials thereon, such as an identification of the type of product being sold and/or a logo of a merchant or service provider. In this respect, a pre-designed card stock can be provided and maintained for use when a user desires to purchase a specific brand card assembly 50. In such an embodiment, the second face 59 of the card assembly is at least partially blank and/or otherwise designed so that the printer assembly 37 can print the corresponding items, such as the authorization code thereon, at a time of purchase. Such a configuration may also allow for different branding opportunities, even from the same transaction terminal 20.

Looking in further detail to the specific embodiment of the printer assembly 37 illustrated in FIG. 1, it is preferably generally elongate, and is formed in association with a remainder of the transaction terminal 20. In this regard, the printer assembly 37 may in include an elongate, generally planar slot 38, through which the elongate, potentially stiff card assembly 50 is passed for appropriate printing thereof. Although, it is recognized that in the case of more conventional transactions, or even in most transactions when a consumer desires to have a receipt of their transaction, the printer assembly 37 may also be utilized for that purpose, such as by printing appropriate receipt information directly on a portion of the card assembly 50 or on a separate document. In the embodiment illustrated in FIG. 1, however, a receipt printer 39 may also be provided. The receipt printer 39, which may be considered part of the overall printer assembly, is structured to print a receipt associated with an authorized transaction for the consumer and as a result need not be provided directly on the card assembly 50. In such an embodiment, the receipt printer 39 is as at least partially distinct from the printer assembly 37. As mentioned, however, and still with reference to FIG. 1, in addition to or instead of the distinct receipt printer 39, the printer assembly 37 may include the receipt printer directly as a part thereof, such as through a separate paper feed, printing directly on the card assembly 50, or requiring a conventional paper stock for the purposes of issuing a more traditional receipt before or after printing of the card assembly 50 and for completion of a desired transaction.

The printer assembly 37 may include any of a variety of different types of printers, however, a thermal type printer configured to print on specially coated and/or configured paper is preferred. Moreover, it is recognized that in some embodiments wherein the card assembly 50 includes the first face 58 with the pre-printed materials thereon and the printer assembly accomplishes one side printing, it is important to ensure that the card assembly 50 is properly introduced into the printer assembly 37 so that the printer assembly 37 will not attempt to print the important information on the pre-printed, first face 58. Indeed, in the case of a thermal printer, the printing process may actually occur, but if it is performed on the pre-printed side and/or an untreated side, no legible printing will ultimately appear and an operator is left without knowing whether a printer malfunction occurred and a specific transaction was actually completed, or whether another malfunction occurred and the transaction was not actually completed. The operator may therefore be left with little choice but to void the first transaction, and issue a new card, often thereby wasting an authorization or account number. In order to prevent such an occurrence the card assembly 50 may preferably include an indicator assembly 60 thereon. The indicator assembly, which may be disposed on the first or second faces of the card assembly 50 preferably functions in association with the printer assembly 37 so as to allow for effective determination of the orientation of the card assembly 50 by the printer assembly 37, and thus preventing printing if the card assembly 50 is not properly oriented. In the illustrated embodiment of FIG. 4 the indicator 60 is disposed on the second face 59 and includes a minimally reflective mark, such as a black or generally opaque stripe disposed on the card assembly 50. Furthermore, the printer assembly includes a correspondingly disposed sensor 36. The sensor 36 is structured to effectively identify said indicator 60 and to thereby determine if the card is properly oriented for printing. In the preferred, illustrated embodiment, the sensor 36 is structured to emit a light beam and detect a reflection thereof. Naturally, if the light beam is directed to the indicator 60, minimal amounts of light, if any will reflect, and the presence of the indicator 60 can be determined. Naturally, the sensor 36 can be configured to interact with the first and/or the second face of the card assembly 50, and it can be configured such that the detection of the indicator 60 is indicative of proper or improper orientation of the card assembly 50.

As indicated, the control processor 40 is structured to receive information relating at least to a payment authority from the transaction processor 30. In the case of a point of sale purchase of goods or services, the control processor 40 may only communicate an appropriate authorization to the transaction terminal to complete the point of sale purchase. In other embodiments, however, when an authorization code is desired for supporting another, typically subsequent transaction, the control processor 40 defines the user account. Along these lines, it is noted that when the control processor 40 defines a user account, a new user account may be provided in connection with each authorization code, or in some instances, an existing user account may be utilized, such as by re-filling. In either instance, however, each user account includes its defined value, whether the defined value begins at zero with the formation of a new user account or is at a defined amount already. The control processor 40 then adds to that defined value an amount defined at least by an authorized payment authority received from the transaction processor in connection with that user account. For example, if payments for point of sale purchases are not involved and a consumer's sole purpose is to obtain an appropriate authorization code for a new user account, or merely to add to an existing user account, a substantial component, if not all of the payment authority will usually be added to the value of the user account. In this regard, it is recognized that processing fees, service fees and the like many be deducted, such that a payment authority for a certain amount will not precisely correspond to the value added to the user account. Conversely, in connection with certain promotions, the value of the user account may be increased by an amount greater than the actual payment authority, such as in connection with an incentive plan where a payment authority of a certain larger amount entitles the consumer to a greater value increase to the user account (i.e. a $20 purchase gives $25 worth of credit).

Although a variety of different transactions may be achieved in connection with the issued authorization code, in one embodiment of the present invention the transaction that is facilitated by the authorization code includes a telephony communication. As a result, pre-paid service is established and an extent of the telephony communication(s) available is limited by the defined value of the user account associated with the authorization code. As mentioned, in such an embodiment a telephony access number is also provided to the user, such as on the card assembly 50, and may in include a toll-free or similar access number which initiates communication with a telephony server. With reference to FIG. 3, whether the telephony access number and or the authorization code are merely viewed on the display assembly 26 or are provided on the card assembly 50 by the printer assembly 37, a consumer utilizes the authorization code and telephony access number in connection with an auxiliary device 60, such as a computer or telephone, so as to communicate with a telephony server. The telephony server in turn communicates with the control processor 40, as at 42, of FIG. 3. Specifically, the auxiliary device 60 such as including the telephone and/or telephony server receives the authorization code and through communication with the control processor 40 is able to identify the user account and the defined value of the user account. Accordingly, the telephony server is able to determine the extent of the telephony communication that can be permitted and which has been paid for. Along these lines, it is recognized that the auxiliary device 62 including possibly the telephony server may be separate or part of the control processor 40, and if separate, may communicate with the control processor 40, as at 42, in order to verify the validity of an authorization code in any manner. Therefore, a consumer, by purchasing the card assembly 50, is giving the requisite authorization code 53 and telephony access number 53' so as to obtain pre-paid telephony communication services, while also receiving the second portion 55 of the card assembly 50 which may include one or more different promotional items thereon. Moreover, a consumer is provided with incentive to purchase the particular card assembly 50 of the merchant over other more traditional calling cards that do not provide any added benefit to the consumer.

In yet another embodiment, and either instead of or in addition to the telephony communication, the transaction that is facilitated by the authorization code 53 may include a lottery purchase. In particular, the control processor 40 may store a predefined quantity of lottery entries, such as in connection to an arrangement with a corresponding lottery commission, and preferably, but not necessarily pre-selected, random number lottery entries. As such, when an indication is made in connection with a payment authority that a lottery purchase is desired, the control processor 40 is able to issue at least one lottery entry 56 in response to the lottery purchase. In this regard it is recognized that the lottery entry 56 may be placed directly on the card assembly 50, such as on the second portion 55, or in some embodiments on the first portion of the card assembly 50 as the actual authorization code. Furthermore, if the control processor 40 is associated with an auxiliary device 62 such as a lottery printing device, the authorization code and/or one or more authorization code's may be provided to the user, either on the display assembly 26 or on the card assembly 50, for presenting in connection with the auxiliary device 62, thereby allowing the user to retrieve a more traditional lottery entry.

In yet another embodiment of the present multi-function transaction processing system 10, the transaction that is facilitated by the authorization code may include a purchase. Specifically, the purchase transaction may be facilitated either instead of or in addition to one or more other transactions such as the telephony communication. As such, it is recognized that one or more authorization codes may be provided to a consumer in connection with one or more payment authorities at the transaction terminal 20. In such an embodiment, the amount of the purchase that may be facilitated utilizing the authorization code is limited by the defined value of the user account associated with the authorization code. Additionally, a remote transaction processor may be provided, such as part of an auxiliary device 62, or integrated directly with the control processor 40. The remote transaction processor is structured to receive the authorization code from the user in connection with a purchase, and as an alternate means of payment for the purchase. For example, if a consumer desires to make an Internet purchase, the consumer will be able to communicate the authorization code to a participating merchant. In this regard, The control processor 40 of the present invention is also preferably structured to maintain records of an activity of the transaction processor 30 and/or communications between the transaction processor 30 and the control processor 40. As a result, a merchant utilizing the transaction terminal is able to obtain records of payment authorities authorized and communicated to the control processor 40, and can identify the effectiveness of the transaction terminal 20 through its activity and through information relating to additional commercial transactions that are promoted by the transaction terminal 20. In this regard, it is recognized that either directly through the transaction terminal 20 or through other conventional means, such as a network interface, communication with the control processor 40 and/or its operators, such as by e-mail transactions and the like, can be achieved, thereby providing the user with substantial account and record keeping information and usage reports. Additionally, the transaction terminal 20 may be provided to a merchant in connection with a plurality of bundled services, such as personal long distance telephone access for use in the operation of the business, Internet access, electronic mail facilities, and the like, thereby providing an overall, beneficial package of services for the merchant.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A multi-function transaction processing system comprising:
   a) a transaction terminal, said transaction terminal including a data entry facility and a transaction processor;
   b) said transaction processor of said transaction terminal being communicatively associated with at least a control processor;
   c) said data entry facility including a payment authority input structured to accept a payment authority;
   d) said control processor structured to define a user account and to issue an authorization code associated with said user account at least in response to said payment authority;
   e) a printer assembly communicatively associated with said transaction terminal and structured to generate a card assembly;
   f) said card assembly including at least a first portion and a second portion, said first portion including at least said authorization code thereon;
   g) said second portion including promotional materials;
   h) said user account including a defined value at least partially defined by said payment authority, said authorization code structured to facilitate a transaction in accordance with said defined value; and
   i) said card assembly including a first side and a second side, said first side including pre-printed materials thereon and said second side structured to be printed on by said printer assembly;
   j) said printer assembly including a sensor structured to detect said indicator on said first side of said card assembly and to prevent said printer assembly from printing on said card assembly if said card assembly is improperly oriented relative to said printer,
   k) said sensor structured to emit light onto said card assembly and to detect a reflection of said light when said card assembly is properly oriented relative to said printer assembly, and
   l) said card assembly including an indicator disposed thereon and structured to prevent said printer assembly from printing on said first side, said indicator including a minimally reflective marker on said card assembly so as to substantially prevent reflection of said light when said card assembly is improperly oriented relative to said printer assembly.

2. A multi-function transaction processing system as recited in claim 1 wherein said transaction that is facilitated by said authorization code includes a telephony communication, an extent of said telephony communication being limited by said defined value of said user account associated with said authorization code.

3. A multi-function transaction processing system as recited in claim 2 wherein said first portion of said card assembly further includes a telephony access number structured to be utilized to initiate said telephony communication with a telephony server.

4. A multi-function transaction processing system as recited in claim 1 wherein said card assembly is generally elongate, said first portion being detachable from said second portion.

5. A multi-function transaction processing system as recited in claim 4 wherein said first portion of said card assembly is structured to be substantially compact.

6. A multi-function transaction processing system as recited in claim 1 wherein said data entry facility includes a keypad.

7. A multi-function transaction processing system as recited in claim 1 wherein said data entry facility includes an electronic signature capture assembly.

8. A multi-function transaction processing system as recited in claim 1 wherein said payment authority input comprises a keypad structured to receive an input related to an external payment verification, said external payment verification at least partially comprising said payment authority.

9. A multi-function transaction processing system as recited in claim 8 wherein said transaction processor is structured to require an access authorization in connection with said external payment verification at least so as to ensure a validity of said external payment verification.

10. A multi-function transaction processing system as recited in claim 9 wherein said transaction processor is structured to communicate said payment authority to said control processor, said control processor structured to at least partially add a value associated with said payment authority to said defined value of said user account.

11. A multi-function transaction processing system as recited in claim 10 wherein said external payment verification is structured to identify a cash transaction.

12. A multi-function transaction processing system as recited in claim 10 wherein said external payment verification is structured to identify a credit transaction.

13. A multi-function transaction processing system as recited in claim 1 wherein said payment authority input is structured to receive credit card transaction information as said payment authority.

14. A multi-function transaction, processing system as recited in claim 13 wherein said credit card transaction information includes at least a credit card account and a transaction amount.

15. A multi-function transaction processing system as recited in claim 14 wherein said transaction processor is structured to communicate said credit card transaction information to said control processor for authorization.

16. A multi-function transaction processing system as recited in claim 15 wherein said control processor is structured to at least partially add said transaction amount associated with said credit card transaction information to said defined value of said user account.

17. A multi-function transaction processing system as recited in claim 15 further comprising a receipt printer structured to print a receipt associated with an authorized transaction.

18. A multi-function transaction processing system as recited in claim 17 wherein said printer assembly includes said receipt printer.

19. A multi-function transaction processing system as recited in claim 17 wherein said receipt printer is at least partially distinct from said printer assembly.

20. A multi-function transaction processing system as recited in claim 13 wherein said payment authority input includes a magnetic stripe reader.

21. A multi-function transaction processing system as recited in claim 13 wherein said payment authority input device includes a keypad.

22. A multi-function transaction processing system as recited in claim 13 wherein said data entry facility includes an electronic signature capture assembly.

23. A multi-function transaction processing system as recited in claim 1 wherein said transaction that is facilitated by said authorization code includes a purchase, an amount of said purchase being limited by said defined value of said user account associated with said authorization code.

24. A multi-function transaction processing system as recited in claim 23 wherein said control processor is structured to authorize said purchase in accordance with said authorization code and said associated account value, thereby restricting access to information associated with a user making said purchase utilizing said authorization code.

25. A multi-function transaction processing system as recited in claim 24 further comprising a remote transaction processor, said remote transaction processor structured to receive said authorization code from said user and to communicate with said control processor so as validate said purchase.

26. A multi-function transaction processing system as recited in claim 1 wherein said transaction terminal further comprises a display screen.

27. A multi-function transaction processing system as recited in claim 1 wherein said transaction comprises a lottery purchase, said control processor structured to store a pre-defined quantity of lottery entries and to issue at least one of said lottery entries in response to said lottery purchase.

28. A multi-function transaction processing system as recited in claim 27 wherein said card assembly includes said lottery entry thereon.

29. A multi-function transaction processing system as recited in claim 1 wherein said control processor is structured to maintain records of an activity of said transaction processor, said activity of said transaction processor including at least a communication of said payment authority to said control processor.

30. A multi-function transaction processing system as recited in claim 1 wherein said control processor is structured to maintain records at least of communications between said transaction processor and said control processor.

31. A multi-function transaction processing system as recited in claim 1 wherein said card assembly is defined from a segment of generally stiff material, said printer assembly structured to receive said segment of generally stiff material therethrough.

32. A multi-function transaction processing system comprising:
   a) a transaction terminal, said transaction terminal including a data entry facility and a transaction processor;
   b) said transaction processor of said transaction terminal being communicatively associated with at least a control processor;
   c) said data entry facility including a payment authority input structured to accept a payment authority;
   d) said control processor structured to issue at least one authorization code;
   e) a printer assembly communicatively associated with said transaction terminal and structured to generate a card assembly;
   f) said card assembly including at least said authorization code thereon;
   g) said card assembly including a first side and a second side, said first side including pre-printed materials thereon and said second side structured to be printed on by said printer assembly;
   h) said first side of said card assembly including an indicator disposed thereon and structured to prevent said printer assembly from printing on said first side;
   i) said authorization code structured to be provided to a merchant in connection with a purchase,
   j) said printer assembly including a sensor structured to detect said indicator on said first side of said card assembly and to prevent said printer assembly from printing on said card assembly if said card assembly is improperly oriented relative to said printer,
   k) said sensor structured to emit light onto said card assembly and to detect a reflection of said light when said card assembly is properly oriented relative to said printer assembly, and
   l) said indicator including a minimally reflective marker on said card assembly so as to substantially prevent reflection of said light when said card assembly is improperly oriented relative to said printer assembly.

33. A multi-function transaction processing system as recited in claim 32 wherein said authorization code is structured to facilitate a transaction including a telephony communication, an extent of said telephony communication being limited by a defined value of a user account associated with said authorization code.

* * * * *